A. N. BLAZER.
ROTARY ENGINE.
APPLICATION FILED NOV. 15, 1906. RENEWED FEB. 10, 1909.

916,258.

Patented Mar. 23, 1909.

2 SHEETS—SHEET 1.

WITNESSES
L. Walker

INVENTOR
Almer N. Blazer
BY Munn & Co.
ATTORNEYS

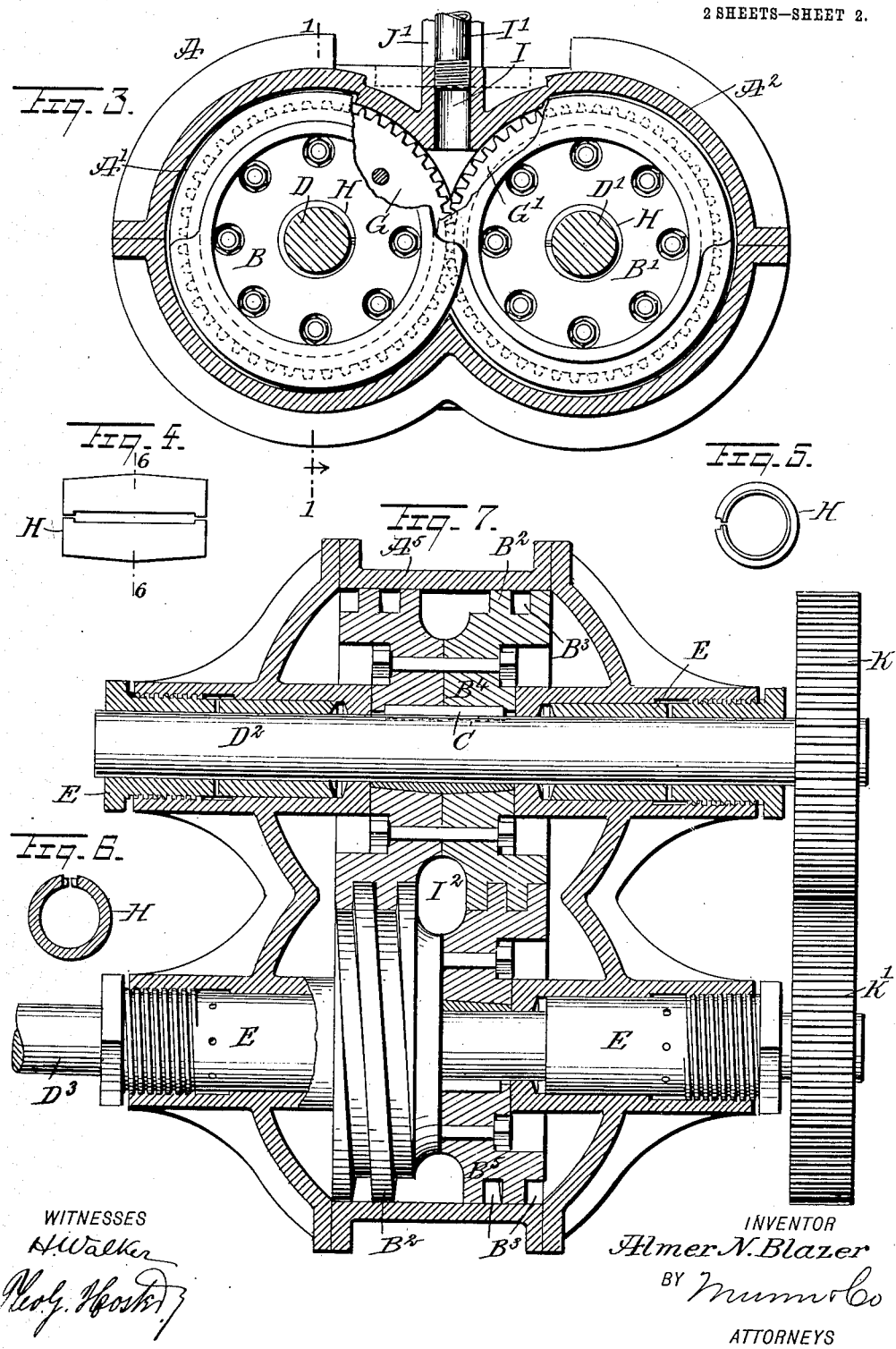

UNITED STATES PATENT OFFICE.

ALMER NEWTON BLAZER, OF MESCALERO, TERRITORY OF NEW MEXICO, ASSIGNOR TO BLAZER SPIRAL ENGINE COMPANY, OF MESCALERO, TERRITORY OF NEW MEXICO, A CORPORATION OF THE TERRITORY OF NEW MEXICO.

ROTARY ENGINE.

No. 916,258.      Specification of Letters Patent.      Patented March 23, 1909.

Application filed November 15, 1906, Serial No. 343,506. Renewed February 10, 1909. Serial No. 477,216.

*To all whom it may concern:*

Be it known that I, ALMER NEWTON BLAZER, a citizen of the United States, and a resident of Mescalero, in the county of Otero and Territory of New Mexico, have invented a new and Improved Rotary Engine, of which the following is a full, clear, and exact description.

The invention relates to rotary engines such as shown and described in the Letters Patent of the United States, No. 612,304, granted to me October 11, 1898.

The object of the present invention is to provide a new and improved rotary engine arranged to take up very little space, to utilize the steam expansively and to run at a very high speed, so as to be specially adapted for driving automobiles and other machinery.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
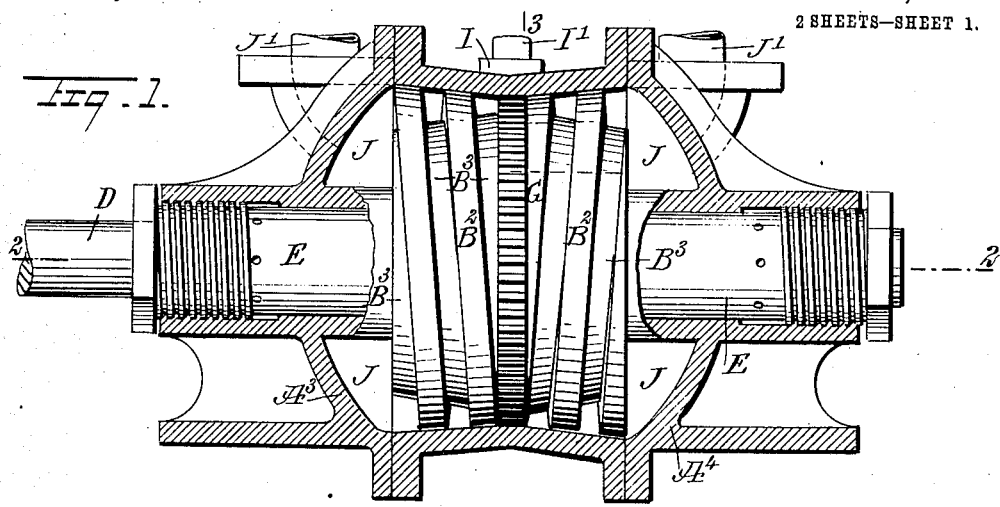
Figures 2, 3:
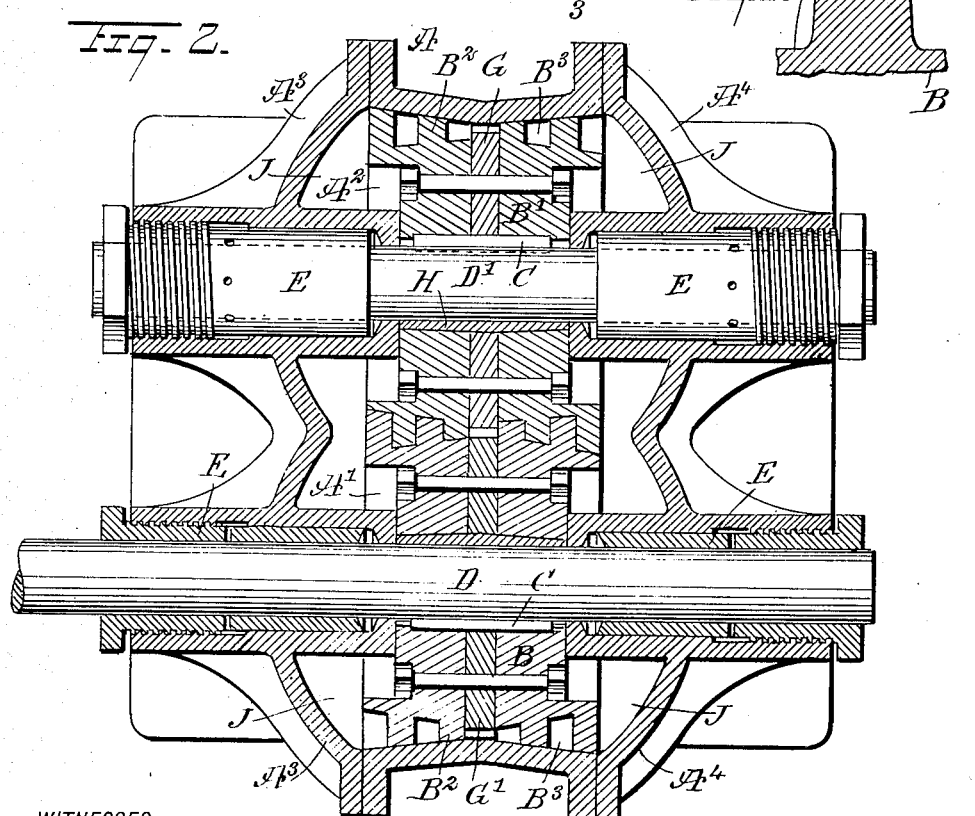

Figure 1 is a longitudinal sectional side elevation of the improvement on the line 1—1 of Fig. 3; Fig. 2 is a sectional plan view of the same on the line 2—2 of Fig. 1; Fig. 3 is a transverse section of the same on the line 3—3 of Fig. 1; Fig. 4 is a plan view of one of the sleeves for centering a piston; Fig. 5 is an end view of the same; Fig. 6 is a transverse section of the same on the line 6—6 of Fig. 4; Fig. 7 is a sectional plan view of a modified form of the improvement, and Fig. 8 is an enlarged cross section of the piston head showing more particularly its cycloid form.

The cylinder A of the improved rotary engine illustrated in Figs. 1, 2 and 3 is provided with the bores $A'$, $A^2$ intersecting each other in a longitudinal direction, as plainly indicated in Fig. 3, and in the said bores are mounted to turn the pistons B and B' secured by keys C or other fastening devices to the shafts D and D' journaled in bushings E screwed or otherwise secured in the heads $A^3$, $A^4$ of the cylinder A. The pistons B, B' are connected with each other by gear wheels G, G' for rotating the pistons B, B' and shafts D, D' in unison with each other, and one of the said shafts as shown, the shaft D, is extended at one or both ends for connection with other machinery to be driven by the rotary engine. Each of the pistons B and B' is provided in its hub with a centering sleeve H tapering from the middle to the ends and snugly fitting the corresponding shaft D or D', the sleeve being split for the passage of the corresponding key C, as will be readily understood by reference to Figs. 4, 5 and 6. Each of the pistons B and B' is provided on its peripheral face with two spiral piston heads $B^2$ forming corresponding spiral grooves $B^3$, and the spiral piston heads $B^2$ of one piston fit into and run in the spiral grooves $B^3$ of the other piston. The gear wheels G and G' are arranged between the inner ends of the piston heads $B^2$ of the corresponding piston B or B', it being understood that the two pistons of each piston head run or wind in opposite directions, as will be readily understood by reference to Fig. 1.

A steam chest I is formed or arranged on the cylinder A adjacent to the contact of the two pistons B and B' (as illustrated in Fig. 3) at the middle of the cylinder A, so that the steam can pass simultaneously into the corresponding grooves $B^3$ of the pistons B and B', to travel in both directions, that is, from the middle of each piston toward the ends thereof. The exhaust steam passes from the ends of the pistons B and B' into exhaust chambers J formed in the cylinder heads $A^3$, $A^4$, and the exhaust steam is conducted from the chambers J by exhaust pipes J' to a suitable place of discharge.

As shown in Figs. 1 and 2 each of the bores $A'$, $A^2$ is in the form of two frusta of cones connected at their small ends, and the pistons B and B' are correspondingly shaped, and the piston heads $B^2$ and their grooves $B^3$ increase in depth from the middle of the pistons to the ends thereof, so as to allow the steam to expand in its travel through a groove $B^3$ from the inner end thereof to the outer end leading into the corresponding exhaust chamber J. By reference to Fig. 3 it will be seen that the piston heads $B^2$ are so arranged relative to the grooves $B^3$ that a piston head at the inner end cuts off the steam from the corresponding groove during one-half revolution of a piston, and the steam passing into the groove during the other half revolution is confined in one convolution thereof and is then cut off by the meshing of the piston head of the other piston, and consequently the steam is used expansively, first from the cut-off at the steam chest I at one-half revolution to the full area of the groove when the revolution is completed and then in the groove at the next revolution. It is apparent that the piston heads and grooves may be arranged and combined in any desired proportions, and thereby the expansion be made as abrupt or as gradual as desired by the addition of more convolutions to the spiral pistons, giving additional expansion to any desired extent.

The contact faces of the piston heads $B^2$ are cut to a true cycloid form, as illustrated in Fig. 8, to insure a proper meshing of the piston heads of the two pistons with the corresponding grooves, to prevent leakage and to allow the steam to properly act on the side walls of the piston heads with a view to rotate the pistons with the full power of the steam and without loss or waste thereof.

In the engine illustrated in Fig. 7, the cylinder $A^5$ has its bores of cylindrical shape, and the pistons $B^4$, $B^5$ are correspondingly shaped, and the gear wheels G and G' are omitted, for, in order to insure the proper running of the pistons $B^4$ and $B^5$ in unison, I provide the shafts $D^2$, $D^3$ at their outer ends with gear wheels K, K' in mesh with each other. The steam chest $I^2$ delivers steam to the spiral grooves of the pistons $B^4$, $B^5$ at the middle thereof, the same as above described in reference to Figs. 1, 2 and 3, and the steam is cut off in the same manner and hence used expansively, as previously explained relative to the engine shown in Figs. 1, 2 and 3, so that further description of this part of the invention is not deemed necessary.

Having described my invention, I claim as new and desire to secure by Letters Patent:

1. A rotary engine having a cylinder provided with intersecting bores, shafts mounted to turn in said cylinders, pistons each provided in its hub with a centering sleeve tapering from the middle to the end and fitting the corresponding shaft, the said pistons being mounted to turn in unison within the said bores and formed on their peripheries with spiral piston-heads, in mesh with each other, and means for introducing the motive agent into the spiral grooves formed by the piston-heads at a point approximately at the middle of the length of the pistons.

2. A rotary engine having a cylinder provided with intersecting bores, shafts mounted to turn in the cylinder heads, pistons each provided in its hub with a centering sleeve tapering from the middle to the end and fitting the corresponding shaft, the said pistons being mounted to turn in unison in the said bores and provided at their peripheries with spiral piston-heads of cycloidal form, the piston-head of one piston running in the spiral groove formed by the piston-head on the other piston, and a steam-chest for supplying steam to the spiral grooves in the pistons at a point approximately at the middle of the length of the pistons.

3. A rotary engine having a cylinder provided with intersecting bores, pistons mounted to turn in the said bores and having spiral piston-heads, and spiral grooves formed by the said heads, the spiral piston-head of one piston running in the spiral groove of the other piston, and the said piston-heads and grooves increasing in size from the middle of the pistons to the ends thereof.

4. A rotary engine having a cylinder provided with intersecting bores, pistons mounted to turn in the said bores and having spiral piston-heads, spiral grooves formed by the said heads, the spiral piston-head of one piston running in the spiral groove of the other piston, and the said piston-heads and grooves increasing in size from the middle of the pistons to the ends thereof, and a steam-chest in the said cylinder, at the middle of the said pistons.

5. A rotary engine having a cylinder provided with intersecting bores, pistons mounted to turn in the said bores and each having two spiral piston-heads and spiral grooves formed by the said piston-heads, the latter and the said grooves running in opposite directions from the middle of the pistons to the ends thereof, the peripheral faces of the two pistons engaging each other at the intersection of the bores of the cylinder, and the piston-heads of one piston running in the grooves of the other piston, a steam-chest in the said cylinder, at the middle of the said pistons, the cylinder heads having exhaust chambers formed therein at opposite ends of the pistons, and into which the exhaust steam passes from the ends of the pistons, and exhaust pipes leading from said exhaust chambers.

6. A rotary engine having a cylinder provided with intersecting bores, pistons mounted to turn in the said bores and each having on its peripheral face two spiral piston-heads and spiral grooves formed by the said piston-heads, the latter and the said grooves running in opposite directions from the middle of the pistons to the ends thereof, the piston-heads of one piston engaging the grooves of the other piston at the intersection of the cylinder bores, a steam-chest in the said cylinder, at the middle of the said pistons, the cylinder being provided with heads having exhaust chambers formed therein at opposite ends of the pistons and into which the exhaust steam passes from the ends of the pistons, exhaust pipes leading from said exhaust chambers, and a gearing for gearing the said pistons together.

7. A rotary engine having a cylinder provided with intersecting bores, pistons mounted to turn in the said bores and each having two spiral piston-heads and spiral grooves formed by the said piston-heads, the latter and the said grooves running in opposite directions from the middle of the piston to the ends thereof, the piston-heads of one piston running in the grooves of the other piston, the said piston-heads and grooves increasing in size from the middle of the pistons to the ends thereof, and a steam-chest in the said cylinder, at the middle of the said pistons.

8. In a rotary engine, a cylinder provided with intersecting bores, shafts mounted to turn in bushings secured to the cylinder heads, pistons each provided in its hub with a centering sleeve tapering from the middle to the end and fitting the corresponding shaft, the said sleeves being each split for the passage of a key for securing the piston to the shaft.

9. A rotary engine having a cylinder provided with intersecting bores, pistons mounted to turn in the said bores and each having two spiral piston-heads and spiral grooves formed by the said piston-heads, the latter and the said grooves running in opposite directions from the middle of the pistons to the ends thereof, the piston-heads of one piston running in the grooves of the other piston, the said bores and the said pistons being in the form of frusta of cones and the said piston-heads and grooves increasing in depth from the middle of the pistons to the ends thereof, and a steam chest in the said cylinder, at the middle of the said pistons.

10. A rotary engine having a cylinder provided with intersecting bores, pistons mounted to turn in the said bores and each having two spiral piston-heads and spiral grooves formed by the said piston-heads, the latter and the said grooves running in opposite directions from the middle of the pistons to the ends thereof, the piston-heads of one piston running in the grooves of the other piston, gear-wheels in mesh with each other and secured to the said pistons, between the adjacent inner ends of the piston-heads, and a steam-chest in the said cylinder, at the middle of the said pistons.

11. A rotary engine, having a cylinder provided with intersecting bores, pistons mounted to turn in the said bores and each comprising two members bolted together, each member being formed on its periphery with a spiral piston head, and a spiral groove formed by the said head, the peripheral faces of the pistons contacting with each other at the intersection of the cylinder bores, the piston heads of the members of one piston running in the spiral grooves of the members of the other piston, the said piston heads and grooves of the members of each piston running in opposite directions from the inner to the outer ends of said members, the said cylinder having outwardly convexed heads provided with extended bearings in which the shafts of the pistons are mounted to turn, the said convexed heads forming with the pistons exhaust chambers provided with outlets, a steam chest on said cylinder at the middle thereof adjacent to the point of contact of the pistons, and means for rotating the pistons and shafts in unison with each other.

In testimony whereof I have signed my name to this specification in the presence of two subscribing witnesses.

ALMER NEWTON BLAZER.

Witnesses:
JAMES W. CARROLL,
A. H. WOMACK.